United States Patent
Southmayd et al.

(10) Patent No.: US 6,352,609 B1
(45) Date of Patent: Mar. 5, 2002

(54) COMPOSITE TOOLING PROCESS FOR CURING MATERIALS AT ELEVATED TEMPERATURES

(75) Inventors: Timothy D. Southmayd, St. Peters, MO (US); Jeffery E. Polus, Hillsboro, IL (US)

(73) Assignee: The Boeing Company, Seattle, WA (US)

( * ) Notice: Subject to any disclaimer, the term of this patent is extended or adjusted under 35 U.S.C. 154(b) by 0 days.

(21) Appl. No.: 09/351,770

(22) Filed: Jul. 12, 1999

(51) Int. Cl.[7] .......................... B32B 31/06; B29C 33/40
(52) U.S. Cl. ...................... 156/289; 156/242; 156/245; 264/219; 264/220; 264/225; 264/226
(58) Field of Search .................................. 156/242, 245, 156/247, 285, 286, 289; 264/219, 220, 225, 226

(56) References Cited

U.S. PATENT DOCUMENTS

| | | | |
|---|---|---|---|
| 4,048,709 A | | 9/1977 | Deem |
| 4,073,049 A | | 2/1978 | Lint |
| 4,086,118 A | * | 4/1978 | Dewey |
| 4,466,936 A | * | 8/1984 | Schapel ...................... 264/225 |
| 4,601,867 A | | 7/1986 | Martell et al. |
| 4,834,929 A | | 5/1989 | Dehoff et al. |
| 4,925,611 A | * | 5/1990 | Shockney et al. ....... 264/219 X |
| 4,929,403 A | * | 5/1990 | Audsley ................. 264/220 X |
| 5,120,480 A | * | 6/1992 | Anderson ................ 264/219 X |
| 5,213,747 A | * | 5/1993 | Lippert ........................ 264/226 |
| 5,215,699 A | * | 6/1993 | Liebermann ............ 264/220 X |
| 5,904,986 A | * | 5/1999 | Smith |

* cited by examiner

Primary Examiner—Curtis Mayes
(74) Attorney, Agent, or Firm—Alston & Bird LLP

(57) ABSTRACT

A method is provided for fabricating a cure tool for curing materials at elevated temperatures. A facility tool is formed having a tool surface defining a mold line corresponding to a pattern of the object to be molded, to which a release coating is then applied. A mixture of a first resin surface coating is then prepared and de-aired to remove air trapped therein before being applied to the tool surface of the facility tool. The layer of the first mixture is then allowed to tack off for a predetermined period of time before being re-smoothed to promote substantially even application thereof to the tool surface. A mixture of a second resin surface coating is then prepared, preferably having a mix ratio by mass of about half the mix ratio by mass of the first mixture, and then de-aired to remove air trapped therein. A layer of the second mixture is then applied to the layer of the first mixture after the layer of the first mixture has tacked off. Once applied, the layer of the second mixture is allowed to tack off for a predetermined period of time. A rigidizing structure is then applied to the layer of the second mixture to substantially fix both the layer of the first mixture and the layer of the second mixture in the form of the tool surface. The cure tool is then post-cured at a raised temperature to raise the glass transition temperature thereof.

6 Claims, 4 Drawing Sheets

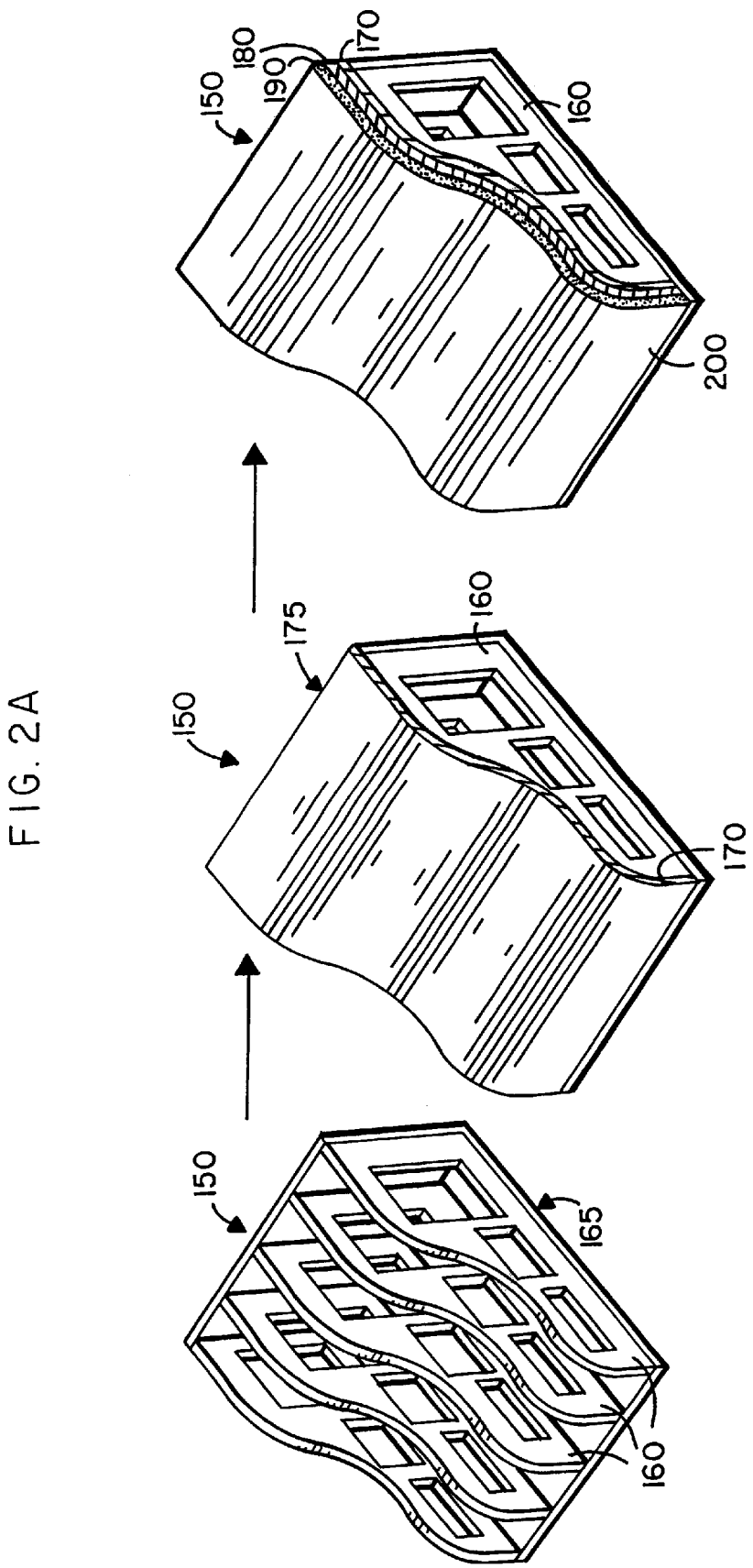

COMPOSITE TOOLING PROCESS FOR CURING MATERIALS AT ELEVATED TEMPERATURES

FIELD OF THE INVENTION

The present invention relates to prototyping processes and, more particularly, to a composite tooling process for curing materials at elevated temperatures.

BACKGROUND OF THE INVENTION

The production of molded articles from resinous fiber materials, especially large and complex articles such as, for example, airplane fuselages, has been subject to cost, complexity, and consistency problems. Especially in a prototyping stage where few articles are produced from the mold, costs, lead-time, and accuracy of the articles produced from the mold are extremely important considerations.

An example of a current process used to produce prototyping cure tools begins by obtaining large "blocks" of 10–15 lb density urethane foam. The foam buns are attached to a base and glued together to form a generic shape. The glue used is, for example, a room temperature laminating system. The foam is then machined to the desired shape using a numerically-controlled (N/C) machine to thereby obtain the desired mold line shape of the pattern or object to be molded. The foam shape is then sealed using a room temperature resin system before the resin is sanded and coated with an automotive type paint primer. Once the master plug or facility tool is formed, two methods are typically used to fabricate the facing sheet of the bond jig or cure tool. In one method, a room temperature cure/high temperature use (RT/HT) resin is used in a pre-preg (material already impregnated with the (RT/HT) resin), wherein the pre-preg is laid up in material sheets on the facility tool and cured out at room temperature or low temperatures (less than 150° F.). A second method for fabricating a facing sheet of the cure tool is to use resin and dry cloth and hand impregnate (apply the resin to the cloth) during the lay-up process. Typically, the cure tool or bond jig is then attached to a carbon epoxy eggcrate structure and removed from the facility tool.

Several limitations and/or problems are associated with such a method for producing cure tools. For example, in the first "half" of the process, the large blocks of the urethane foam usually carry an accompanying manufacturer lead-time of up to approximately 6–8 weeks, with 3–4 weeks lead-time being about average. A further problem is that the foam generally does not machine well. This is evidenced in that measurement variances of the machine molds are often much greater than the acceptable tolerance of within 0.010 inches of the theoretical mold line. The poor machinability of the foam may be due to two different problems therewith. First, the foam structure can be considered as a plurality of foam balls glued together. As the foam structure is machined, the balls are "torn" from the glue instead of being cut to form the desired contour. Thus, in actuality, the foam balls are being pulled off the surface of the structure instead of being actually cut, thereby resulting in a rough surface finish following the machining process. A second additional problem stems from the fact that the foam balls pulled from the surface of the structure during the machining process are actually abrasive and contribute to additional machining of the foam structure from a grinding process in the vicinity of the cutter.

After the foam mold is machined, resin is applied to the foam structure to fill and smooth out the surface. The resin is added about the foam structure, sanded smooth, and coated with an automotive-type paint primer before the surface is hand worked to achieve a smooth finish. However, the dimensional accuracy of the prototype tool is typically unknown due to the extensive handwork involved in finishing the facility tool. In addition, the vacuum integrity of these foam tools is generally hard to achieve. If the tooling surface facility tool cannot be subject to a good vacuum without leakage therethrough due to poor consolidation of the tool structure or other factors, the cure tool produced from the facility tool may be unusable. Further, these foam tools are also susceptible to damage. Any loads applied to the tools must be evenly distributed in order to avoid damage to the mold. Thus, there exists a need for a method of making a cure tool wherein extensive handwork is not required to produce an acceptably smooth finish on the cure tool, thereby resulting in a more determinable dimensional accuracy thereof. Further, there exists a need for a method of forming a cure tool wherein the tools or molds used in the process have good vacuum integrity. In addition, there exists a need for a method of forming a cure tool wherein the facility tool and the cure tool are sufficiently strong to withstand damage due to uneven forces applied thereto.

Further limitations in typical prototyping processes are encountered in the fabrication of the facing sheet of the cure tool or bond jig. Typically, using a room temperature cure/ high temperature use (RT/HT) material, the time required to lay-up the tool is less with the pre-preg material than with the hand-impregnated material. Further, though the curing of these materials can be performed at room temperature, this usually produces a poor quality tooling that results in poor surface quality and/or poor vacuum integrity. Curing a pre-preg tool at elevated temperatures produces a better quality tooling. However, the same problems of poor surface quality and poor vacuum integrity may still exist, albeit to a lesser extent. The best results for RT/HT tools are typically obtained by curing the tools at temperatures up to 150° F. and at an elevated pressure. However, the size of the mold may be a limiting factor in this situation where the size of the temperature/pressure chamber may be limited. In addition, foam facility tooling materials generally have a high coefficient of thermal expansion. Thus, compensation during the machining process of foam molds must be made in order to allow for expansion of the mold when cured or used at high temperatures. Further, since the foam is typically glued up from smaller pieces or buns of the foam to form the mold, the growth of the mold at elevated temperatures is not uniform. In this regard, the bond or glue lines between the foam buns will not grow at the same rate as the foam itself.

Hand impregnation using a RT/HT resin does increase the time necessary to fabricate the lay-up, but the quality of the mold produced increases accordingly. However, the hand impregnation method is also dependent on the vacuum integrity of the foam mold. If the foam is not able to pull a sufficient decreased pressure or vacuum, and maintain that decreased pressure, a poor quality cure tool will result. In addition, the hand impregnation method requires a debulk of the plies at every few layers. This increases the number of required debulks as compared to a pre-preg material. Further, the use of a vacuum bagging material around the edges of the mold can result in damage to the surface coat and necessitate additional time for repairs during the lay-up of the tool. Thus, there exists a need for a method of forming a cure tool or bond jig wherein the tooling produced has good surface quality and vacuum integrity after being cured at room temperature. In addition, there exists a need for a method of fabricating a cure tool or bond jig wherein compensation for expansion of the facility tool at high temperatures is minimal or not required. However, if the facility tool were to expand as a function of temperature, it would be preferable for the mold to expand uniformly. In addition, there exists a need for a method of forming a cure tool wherein the vacuum bagging material used to cover the facing sheet and to seal to the facility tool during the curing process for the facing sheet can be removed therefrom without damage to the facing sheet.

The fabrication of molding tools has been addressed in a number of ways. For example, U.S. Pat. No. 4,073,049 to Lint discloses a method of making a mold for vacuum thermoforming which consists of applying a gel coat to a master pattern, applying a rigidizing mixture of a thermosetting resin and glass to the gel coat, constructing and bonding an eggcrate framework to the cured thermoset resin and glass fiber mixture, filling the spacings of the eggcrate framework with a polymeric rigidizing foam, forming a vacuum plenum on the foam-filled eggcrate, attaching a vacuum plenum thereto, and forming air passageways through the gel coat which communicate with the vacuum plenum. However, the vacuum forming mold plug disclosed by the '049 patent generally comprises a spray-up mold shell formed of standard thermosettable resins such as a polyester resin and chopped glass fiber. Further, the reinforcing eggcrate framework is preferably formed of wood and then bonded to the mold shell before the internal spacings in the eggcrate structure are filled with a polymeric rigidizing foam. The '049 patent further discloses that the resulting mold is sufficient for forming plastic materials of 0.250 inches or less in thickness which are required to be heated to 350° F. However, the use of a resin/glass fiber spray-up to form the mold shell, the wooden eggcrate framework, and the polymeric foam fill, results in a structure having differing coefficients of thermal expansion between the elements. Thus, the vacuum forming mold plug disclosed by the '049 patent may possibly become distorted upon heating during the thermoforming cycle and result in questionable vacuum integrity and dimensional accuracy thereof. Further, the use of a central vacuum plenum pulling a vacuum on the article to be molded through a plurality of air passageways extending through to the mold shell may also contribute to a poor surface finish on the molded article as well as possible distortion due to the uneven distribution of the vacuum.

U.S. Pat. No. 4,834,929 to Dehoff et al. discloses a method of making molds by applying a plurality of layers of materials to a pattern. The method includes providing a pattern of the part to be formed, orienting the pattern on a surface plate in a molding dam, applying a release coating to the surfaces, applying a thin resin layer to form the mold surface, applying a layer of fiber reinforced tooling resin to the thin resin layer, applying an epoxy-dry plaster bonding layer to the tooling resin, inserting a reinforcement framework into the dam, and applying bulk casting plaster to complete the body of the mold.

According to the '929 patent, the fabrication process forms a mold having a gel coat layer followed by two resin-glass fiber layers. A layer of an epoxy tooling medium mixed with dry plaster is then applied to the fiberglass layers as a binder coat, into which is immediately pressed a veiling of continuous strand glass fiber. A metal reinforcing framework is then placed in the epoxy-plaster layer before a bulk casting material comprising gypsum tooling cement is poured therearound to completely enclose the framework. A final layer of continuous strand glass fiber veiling is then applied to the wet plaster surface to prevent surface cracking during cure.

However, the mold disclosed by the '929 patent may also experience problems in molding articles at high temperatures due to the use of materials with different coefficients of thermal expansion to form the mold. Further, the use of a cast-in reinforcing framework, which also serves as attachment points external to the mold, may cause distortion of the mold from misalignment. In addition, the application of the initial gel coat layer is applied only to areas of the mold where the subsequent glass fiber lamination layers are applicable. Catalyzed gel coat putty is then applied to the areas of the mold which the glass fiber lamination layers are not able to sufficiently cover. Thus, the surface finish of the mold disclosed in the '929 patent may be compromised by having a discontinuous gel coat layer.

Thus, there exists a need for a method of making a cure tool wherein extensive handwork is not required to produce an acceptably smooth finish or surface quality on the cure tool, thereby resulting in a more determinable dimensional accuracy thereof. Further, there exists a need for a method of forming a cure tool wherein the tools or molds used in the process have good vacuum integrity. In addition, there exists a need for a method of forming a cure tool or bond jig wherein the tooling produced has good surface quality and vacuum integrity after being cured at room temperature. A method of fabricating a cure tool or bond jig would also be desirable wherein compensation for expansion of the facility tool at high temperatures is minimal or not required. However, if the facility tool were to expand as a function of temperature, it would be preferable for the mold to expand uniformly.

SUMMARY OF THE INVENTION

The above and other needs are met by the present invention which, in a preferred embodiment, provides a method of fabricating a cure tool for curing materials at elevated temperatures. The process forms a gel coat by applying layers of first and second resin surface coating mixtures to a tool surface of a facility tool which has preferably been previously coated with a release coating. As such, the process can begin by forming the facility tool having a tool surface defining a mold line corresponding to a pattern of the object to be molded. The tool surface is preferably formed of a tooling putty capable of a high quality finish to within the tolerances of the mold line. Once the facility tool is completed, a release coating is typically applied to the tool surface to facilitate separation of the cure tool from the facility tool. The release coating is then allowed to flash off for a predetermined period of time, such as at least 48 hours and, preferably, about four days.

According to one advantageous embodiment of the present invention, a mixture of a first resin surface coating is then prepared and de-aired to remove air trapped therein. A layer of the first resin surface coating mixture is then applied to the tool surface of the facility tool. The layer of the first mixture is then allowed to tack off for a predetermined period of time after being applied. Preferably, the layer of the first mixture is allowed to tack off for 30 minutes before being re-smoothed to promote substantially even application thereof to the tool surface. A mixture of a second resin surface coating is then prepared and then de-aired to remove air trapped therein. According to one particularly advantageous aspect of the present invention, the second mixture has a mix ratio by mass that is less than and, more preferably, is about half the mix ratio by mass of the first mixture. A layer of the second mixture is then applied to the layer of the first mixture after the layer of the first mixture has tacked off. Once applied, the layer of the second mixture is allowed to tack off for a predetermined period of time after being applied, preferably about one hour.

A rigidizing structure can then be applied to the layer of the second mixture to substantially fix both the layer of the first mixture and the layer of the second mixture in the form of the tool surface. The layer of the first mixture, the layer of the second mixture, and the rigidizing structure combine to form the cure tool. Preferably, the rigidizing structure comprises a plurality of plies of resin-impregnated carbon fiber applied to the layer of the second mixture and an eggcrate structure comprised of carbon epoxy members subsequently bonded thereto. Each ply of said plurality of plies is further vacuum-debulked after application thereof to promote wet out. Once the predetermined number of plies has been applied to the layer of the second mixture, a peel ply is applied. The layer of the first mixture, the layer of the second mixture, said plurality of plies, and said peel ply together comprise a facing sheet. Once the facing sheet is formed, it is bagged to the facility tool and preferably subjected to a decreased pressure of between about 25 and about 29 inches of mercury at room temperature for a period of about 48 hours to debulk and consolidate the facing sheet.

Once the facing sheet has been formed and cured, the peel ply is removed and an eggcrate structure comprised of carbon epoxy members is bonded to the facing sheet to complete the rigidizing structure and form the cure tool. Preferably, the coefficient of thermal expansion of the eggcrate structure corresponds to the coefficient of thermal expansion of the facing sheet. After the rigidizing structure has been applied to the facing sheet to form the cure tool, the cure tool is removed from the facility tool and post-cured; preferably free standing (without facility tool) and at a temperature of at least about 390° F., to raise the glass transition temperature thereof. The resulting cure tool is useful for molding objects in high temperature autoclave environments, for example, at temperatures of about 355° F. and pressures of about 100 psi. The process according to a preferred embodiment of the present invention produces better consolidation between layers of the materials forming the facing sheet, thereby eliminating leak paths therethrough and forming an improved mold tool by improving the vacuum integrity thereof.

Thus, embodiments of the present invention provide a cure tool or bond jig which does not require extensive hand work in order to attain a high quality finish with high vacuum integrity. Advantageously, facility tools and cure tools are produced which are sufficiently strong to withstand uneven forces applied thereto. Another advantageous aspect of the present invention is that, since the cure tool is comprised of carbon epoxy components, compensation for dimensional variation at high temperatures is not required when forming carbon epoxy molds from the cure tool since the coefficient of thermal expansion of the cure tool is the same as the mold. Further, the construction of the cure tool from carbon epoxy elements followed by the post-cure process advantageously results in a cure tool which will expand generally uniformly as a function of temperature. In addition, the peel ply offers excellent surface finish to allow bonding of the eggcrate to the facing sheet.

BRIEF DESCRIPTION OF THE DRAWINGS

Some of the advantages of the present invention having been stated, others will appear as the description proceeds, when considered in conjunction with the accompanying drawings in which:

FIGS. 2A and 2B are perspective views illustrating a sequence of method steps for fabricating a representative cure tool according to one embodiment of the present invention.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
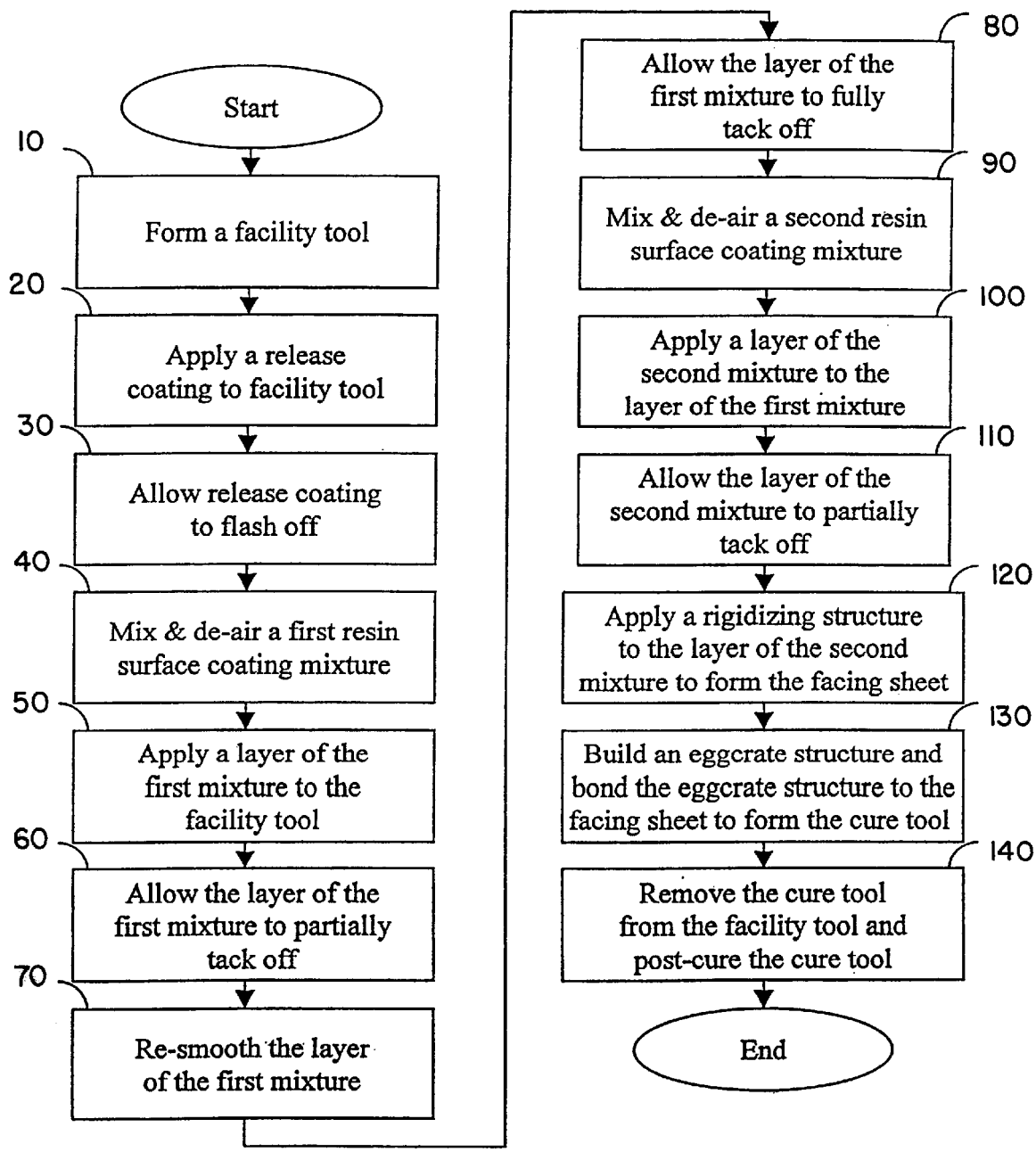
FIG. 1 is a flow diagram illustrating a method of fabricating a cure tool according to one embodiment of the present invention.

FIG. 1 discloses a method of fabricating a cure tool for curing materials at elevated temperatures in accordance with one embodiment of the present invention. The process begins by forming a facility tool (block 10), wherein the facility tool forms the master plug or master mold corresponding in shape to the desired object or pattern to be molded. For example, the facility tool can be in the shape of a portion of an aircraft fuselage, a boat hull, or the like. The facility tool generally comprises structural members cut in accordance with two-dimensional drawings and then fastened theretogether to form an eggcrate shape. The eggcrate shape is then sheathed with a cover to create a "buck," wherein the buck (the structural members and the cover) is preferably comprised of wood. Low density urethane foam is then sprayed on top of the buck and the foam then machined to the general shape of the pattern, but below the final mold line. Preferably, chopped resin-impregnated fiberglass is then sprayed on top of the foam to help stabilize the foam and provide a good base for a finish layer. The finish layer typically comprises a nylon based tooling putty which is sprayed on the fiberglass layer to form a layer thereon of about one inch in thickness. The tooling putty is then machined to the final mold line shape and inspected to ensure that the surface is within the mold line tolerance of about 0.010 inches. The facility tool is then coated with a paint primer material and then buffed out to form the desired smooth mold line shape.

The next step in the process is to apply a release coating to the facility tool (block 20). The release coating is typically an alcohol-based solution which is wiped onto the tooling surface of the facility tool. Following application, the release coating is allowed to flash off (block 30). Flash off is the process by which the alcohol evaporates from the solution and leaves a solid release coating on the tooling surface of the facility tool. Preferably, the release coating is allowed to flash off for at least 48 hours and, more preferably, for about four days. In general, it is more preferable to have the release coating flash off for as long a period of time as possible, with at least 48 hours generally being required and about four days providing acceptable performance according to a preferred embodiment of the present invention.

Once the facility tool has been prepared with a release coating, a cure tool is formed therefrom. The cure tool or bond jig is the mold from which one or more of the desired molded objects is subsequently formed. Thus, it is desirable for the facility tool to match the shape and surface finish characteristics of the desired molded object as closely as possible since the first layers of the cure tool will inherit the characteristics of the facility tool. According to a preferred embodiment of the present invention, the first layers of the cure tool comprise a resin surface coating mixture or gel coat.

A first resin surface coating mixture, such as an Airtech 5001 resin made by Airtech International of Huntington Beach, Calif., is prepared, mixed, and then de-aired (block 40) for a predetermined period of time, such as generally for 5 minutes, to remove any air trapped in the gel coat mixture. A thin layer of the first gel coat mixture is then applied to the tooling surface of the facility tool (block 50). The first layer is then allowed to partially "tack off" or begin to cure for a predetermined period of time, preferably about 30 minutes (block 60). Following the initial tack off period of the first layer, the first layer is manipulated by being re-smoothed (block 70) to ensure an even distribution of the first layer and to ensure uniform adhesion of the first layer over the tooling surface of the facility tool. The first layer is then allowed to further tack off and, preferably, to fully tack off (block 80).

A mixture of a second resin surface coating, such as the Airtech 5001 resin, is then prepared, mixed, and de-aired (block 90) for a predetermined period of time, such as generally for 5 minutes. Preferably, the second resin surface coating has a lesser mix ratio by mass than the mix ratio by mass of the first resin surface coating. More preferably, the mix ratio by mass of the second resin surface coating mixture is about half the mix ratio by mass of the first resin surface coating mixture. Once the second gel coat mixture is prepared, mixed, and de-aired, a thin layer thereof is applied to the layer of the first mixture (block 100). Following application of the layer of the second mixture, the second gel coat layer is allowed to tack off (block 110). Preferably, the tack off period for the second gel coat layer is between about one hour and about three hours, or to a point where the second gel coat layer remains slightly tacky. More preferably, the second gel coat layer is allowed to tack off for about one hour.

Accordingly, after the second gel coat layer has been allowed to tack off for preferably about one hour, a plurality of plies of resin-impregnated carbon cloth are applied thereto. The carbon cloth/resin forms a rigidizing structure when applied to the gel coat layers, substantially fixing the gel coat layers in the form of the tooling surface of the facility tool. In one advantageous embodiment, the laminate structure comprises 14 plies of a carbon cloth, wherein the first and the last plies of the laminate are a 3K cloth and the middle 12 plies are a 12K carbon cloth. However, the laminate structure can include different numbers of plies and different types or grades of carbon cloth without departing from the spirit and scope of the present invention. Each layer of carbon cloth is vacuum debulked to ensure that the layer is wet out, generally meaning that the resin impregnating the carbon cloth has been evenly distributed and fully cured across the respective laminate layer. Further, each subsequent carbon cloth layer is angularly displaced from the previous layer by an angle of preferably about 45° to prevent warping of the facing sheet. The resin system for impregnating the carbon cloth plies is, for example, the Airtech 2001 resin made by Airtech International of Huntington Beach, Calif.

Once the last ply of the laminate structure has been applied, a final peel ply is further added to complete the facing sheet comprising the gel coat layers, the laminate structure, and the peel ply (block 120). The facing sheet is then bagged to the facility tool. That is, the facility tool is typically built oversized in terms of the area of the tooling surface. Thus, after the facing sheet has been applied to the tooling surface of the facility tool, there is a strip of the tooling surface surrounding the perimeter of the facing sheet. A vacuum bagging material is then applied over the facing sheet and sealed to the perimeter of the tooling surface theresurrounding. The vacuum bagging is, for example, a polymeric layer to which a decreased pressure or "vacuum" of between about 25 and about 29 inches of mercury is applied. The bagged facing sheet is held at this decreased pressure condition at room temperature for a predetermined time period, preferably about 48 hours, to debulk and consolidate the facing sheet. After the facing sheet has cured, the vacuum bagging is removed along with the peel ply and an eggcrate structure comprised of carbon epoxy members is built and bonded to the facing sheet to complete the rigidizing structure and form the cure tool (block 130). By forming the eggcrate structure from carbon epoxy members, the coefficient of thermal expansion of the eggcrate structure thereby corresponds to the coefficient of thermal expansion of the facing sheet. The matching coefficients of thermal expansion results in the cure tool having predictable and uniform expansion as a function of temperature. Once the cure tool has been completed, it is removed (removed from the facility tool) and then post-cured (block 140) at a temperature of at least about 390° F. to raise the glass transition temperature thereof and produce a rigid uniform structure.

Figure 2B:
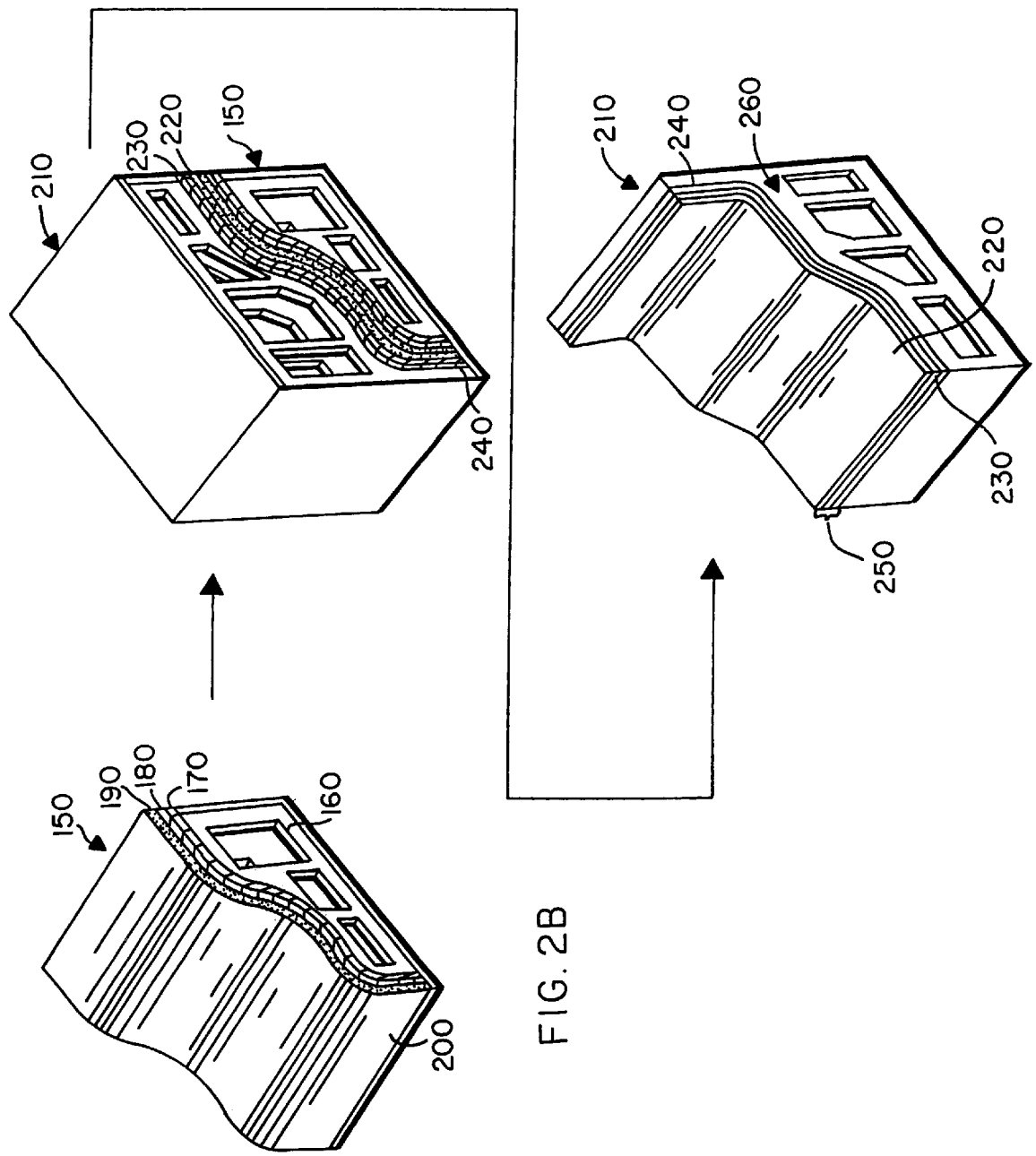

FIGS. 2A and 2B graphically depict a composite tooling process for curing materials at elevated temperatures according to one embodiment of the present invention and as further shown in FIG. 1. More particularly, FIG. 2A shows a sequence of steps used to produce the facility tool, generally indicated by the numeral 150. The facility tool 150 generally comprises a plurality of structural members 160, a covering sheath 170, a layer of polymeric foam 180, a fiberglass layer 190, and a layer of tooling putty 200.

The structural members 160 are cut from flat sheets of, for example, plywood or chipboard according to two-dimensional drawings. The structural members 160 are then stood on edge in an adjacent parallel relation and then attached together by corresponding perpendicular members (not shown) to form an eggcrate shape 165. The upper edges of the structural members 160 thus define the general contours of the object or pattern to be molded. A cover sheath 170 is then applied to the tipper edges of the structural members 160 to provide a cover and to create a wooden "buck" 175.

Once the wooden buck 175 has been formed, a polymeric foam 180 is then spray-applied on top of the cover sheath 170 of the buck 175. The foam may be, for example, a 3 lb low density urethane foam which is spray-applied on top of the cover sheath 170. The foam is then machined to below the mold line surface using, for example, a high-speed five axis mill. A stabilizing layer 190 is then sprayed on the surface of the foam 180 to stabilize the foam as well as provide a good base for the tooling putty layer 200. The stabilizing layer 190 is, for example, a layer of a chopped fiberglass/resin mixture. Once the stabilizing layer 190 has cured, a tooling putty 200 is then spray-applied in layers thereover. The tooling putty layer 200 is, for example, a nylon-based tooling putty which is applied in layers to a final thickness of about one inch. Following curing of the tooling putty, the tooling putty layer 200 is machined to the final mold line shape (or final shape of the pattern or object to molded) and roughly inspected to make sure that the surface is within mold line tolerance, which is typically within 0.010 inches. The facility tool 150 is then coated with an automotive-type paint primer and then buffed out to a mirror-like finish. The facility tool 150 is then complete and ready for use.

FIG. 2B shows the method steps of forming a cure tool 210 in accordance with one embodiment of the present invention and as further shown in FIG. 1. More particularly, the cure tool or bond jig fabrication process begins by applying a layer of mold release (not shown) to the facility tool 150. The mold release may be, for instance, an alcohol-based solution which is wiped onto the facility tool 150 and then allowed to flash off. Flash off is the process by which the alcohol evaporates out of the solution and leaves a coating layer of the mold release on the tooling surface of the facility tool 150. The flash off period is at least 48 hours, with at least about four days being preferred.

The formation of the cure tool 210 then begins by the application of layers of a resin surface coating or gel coat to the facility tool 150. The gel coat layers generally form the molding surface of the cure tool or bond jig 210 and may comprise, for instance, an Airtech 5001 resin. The process of laying down the gel coat layers begins by mixing a first resin surface coating mixture and then de-airing the same to remove air trapped therein. A thin layer 220 of the first mixture is then evenly applied across the surface of the facility tool 150 and allowed to tack off for a predetermined period of time. Preferably, the layer of the first mixture 220 is allowed to tack off for about 30 minutes. During the initial tack off period, the layer 220 of the first mixture may separate from or lose adhesion with the tool surface at some locations. Thus, after the tack off period, the layer of the first mixture 220 is then manipulated, such as by being re-smoothed, to obtain a substantially even and uniform distribution of the layer of the first mixture 220 about the tooling surface of the facility tool 150 and to ensure uniform adhesion with the tooling surface. Further, the facility tool 150 may initially have been formed with an oversize area of the tooling surface. That is, the area of the tooling surface may have been formed with greater area dimensions than the final dimensions of the cure tool 210, for example, greater length and width dimensions. As further described below, an exposed area of the tooling surface is typically retained about the perimeter of the subsequently formed cure tool 210.

Once the layer of the first mixture 220 is re-smoothed, the layer of the first mixture 220 is allowed to tack off and, preferably, fully tack off. During this time, a second mixture of a resin surface coating is formed and de-aired to remove air trapped therein. Preferably, the second mixture has a lesser mix ratio by mass than the mix ratio by mass of the first mixture. More preferably, the second mixture has a mix ratio by mass of about 50% of the mix ratio by mass of the first mixture. A thin layer of the second mixture 230 is then applied to the fully tacked off layer of the first mixture 210. The layer of the second mixture 230 is then allowed to tack off until a slight tack is attained. Typically, the layer of the second mixture 230 is allowed to tack off for between about one hour and about three hours, with a tack off period of about one hour being preferable.

Within the predetermined tack period of the layer of the second mixture 230, a process of applying a reinforcing laminate structure 240 to the gel coat layers 220 and 230 begins. According to a preferred embodiment of the present invention, the laminate structure 240 comprises 14 plies of a carbon cloth. The first and the last plies typically comprise a 3K cloth, wherein the designation 3K denotes a fiber size of the carbon cloth of about 3,000 tows per strand, and wherein such designations of carbon cloth are well known to those skilled in the art. Further, the middle 12 layers of the laminate structure 240 typically comprise a 12K carbon cloth. Each of the plies is typically impregnated with a resin, such as the Airtech 2001 resin system, before application. After each layer has been applied, it is vacuum debulked to ensure that the layer is wet out and the resin uniformly distributed throughout the layer, wherein the process of vacuum debulking is well known to those skilled in the art. Further, each subsequent layer of the laminate structure 240 is applied to the preceding layer with an angular displacement with respect thereto to prevent warping. Preferably, the plies are separated by an angular displacement of about 45°. After the last ply of the laminate structure 240 is applied, a peel ply (not shown) is also added. Thus, the layer of the first mixture 220, the layer of the second mixture 230, the laminate structure 240, and the peel ply together comprise a facing sheet 250.

Once the facing sheet 250 has been formed, it must be cured to form a rigid structure. To this end, the facing sheet 250 is bagged to the surface of the facility tool 150. That is, an impervious material, such as a polymeric sheet, is placed over the facing sheet 250 and sealed to the exposed strip of the tooling surface of the facility tool 150 surrounding the facing sheet 250 and resulting from the "oversize" of the facility tool 150. A decreased pressure or "vacuum" is then applied to the bagging. Preferably, the facing sheet 250 is subjected to a decreased pressure of between about 25 inches and about 29 inches of mercury and allowed to cure at room temperature for a predetermined time, preferably about 48 hours.

The cured facing sheet 250 is then further provided with a reinforcing structure 260 to form the final cure tool 210. According to a preferred embodiment of the present invention, the reinforcing eggcrate structure 260 is fabricated from cured high temperature carbon epoxy tooling boards. Carbon epoxy structural members are used to form the eggcrate structure 260 in order that the coefficient of thermal expansion of the eggcrate structure 260 match the coefficient of thermal expansion of the facing sheet 250. The boards are first designed and cut before being assembled and bonded together to form the eggcrate structure 260. After the eggcrate structure 260 has been formed, it is placed on top of the facility tool 150 in engagement with the backside of the facing sheet 250. The eggcrate structure 260 is then bonded to the facing sheet 250 using bonding straps (not shown) to form the cure tool 210. Once the cure tool 210 has been formed and is cured at room temperature, the cure tool 210 is pulled off the facility tool 150 and then post-cured to raise the glass transition temperature of the facing sheet 250 as well as the bonded joints between the facing sheet 250 and the eggcrate structure 260. According to a preferred embodiment of the present invention, the cure tool 210 is suitable for use in high temperature autoclave conditions, for example, temperatures of about 355° F. and pressures of about 100 psi. Thus, the cure tool 210 is post-cured at about 390° F. to raise the glass transition temperature thereof as well as to ensure that the working temperature of the cure tool 210 has been exceeded by a slight margin. During the post-cure, the eggcrate structure 260 reinforces and maintains the shape of the facing sheet 250. Thus, while the cure tool in accordance with a preferred embodiment of the present invention may be used to mold objects under high temperature autoclave conditions, it is also understood that the cure tool may also be used in, for example, non-autoclave processes and room temperature processes.

Figure 3A:
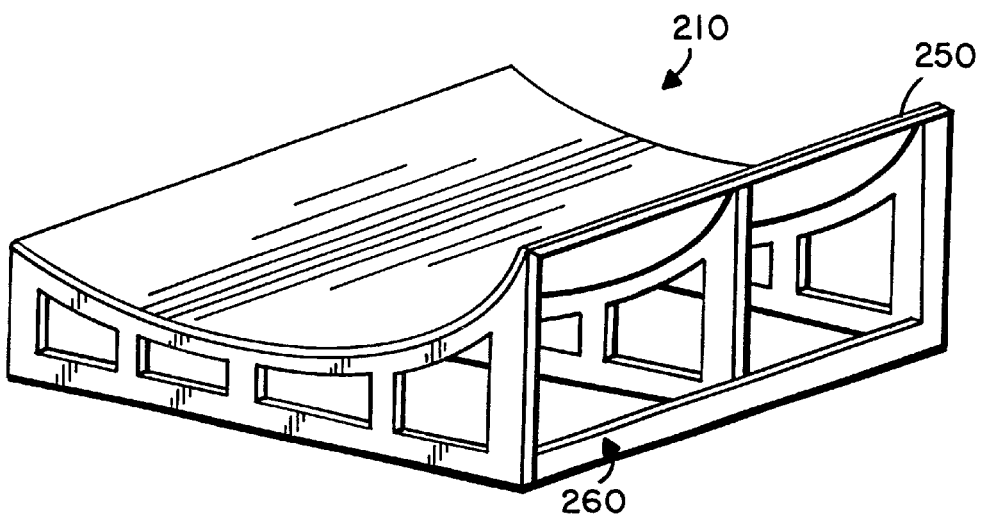
FIG. 3A is a perspective view of a representative cure tool according to one embodiment of the present invention.
Figure 3B:
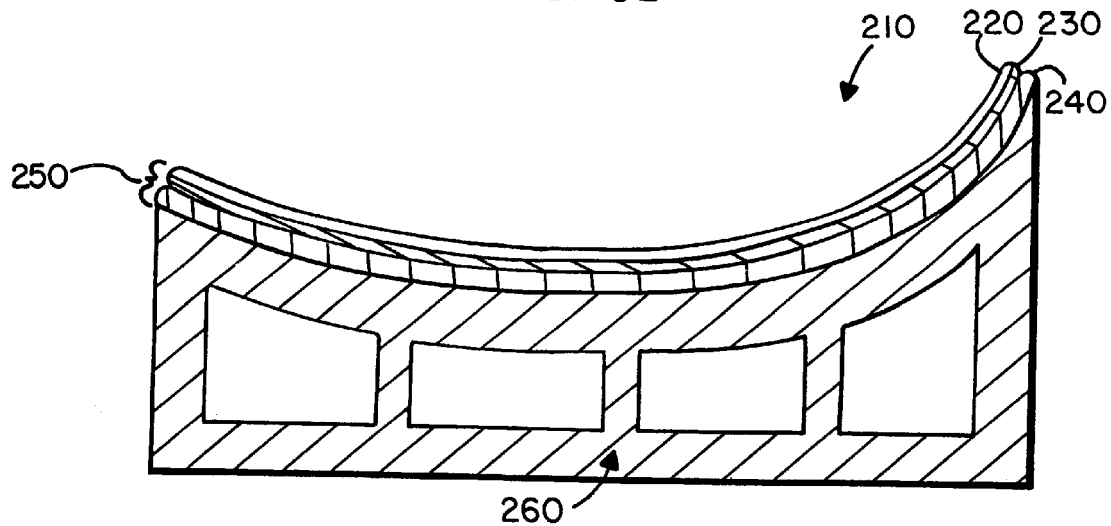
FIG. 3B is a frontal view of a representative cure tool according to the embodiment of the present invention shown in FIG. 3A.

FIGS. 3A and 3B show a typical cure tool 210 in both a perspective view and a frontal elevation. According to a preferred embodiment of the present invention, an accurate high temperature cure tool is obtained since the coefficient of thermal expansion of the cure tool generally matches the coefficient of thermal expansion of carbon epoxy parts to be molded. Further, the preferred method of producing the cure tool is simplified over current methods since the components comprising the cure tool are cured at room temperature and results in a high quality tool surface with high vacuum integrity. Vacuum integrity results from efficient consolidation of the various layers comprising the facing sheet, which minimizes possible leak paths therethrough.

Thus, embodiments of the present invention provide a cure tool or bond jig which does not require extensive hand work in order to attain a high quality finish with high vacuum integrity. Advantageously, facility tools and cure tools are produced which are sufficiently strong to withstand uneven forces applied thereto. Another advantageous aspect of the present invention is that, since the cure tool is comprised of carbon epoxy components, compensation for dimensional variation at high temperatures is not required when forming carbon epoxy molds from the cure tool since the coefficient of thermal expansion of the cure tool is the same as the mold. Further, the construction of the cure tool from carbon epoxy elements followed by the post-cure process advantageously results in a cure tool which will expand generally uniformly as a function of temperature.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method of forming a gel coat layer of a cure tool, said method comprising the steps of:

de-airing a first resin surface coating mixture to remove air trapped therein;

applying a layer of said de-aired first resin surface coating mixture upon a tool surface of a facility tool;

allowing the layer of the first mixture to tack off for a predetermined period of time after being applied;

thereafter manipulating the layer of the first mixture to promote substantially even application thereof to said tool surface;

de-airing a second resin surface coating mixture to remove air trapped therein;

applying a layer of said second resin surface coating mixture to said layer of the first mixture after said layer of the first mixture has tacked off; and allowing the layer of the second mixture to tack off for a predetermined period of time after being applied in order to form the gel coat.

2. A method according to claim 1 wherein the step of allowing the layer of the first mixture to tack off further comprises allowing the layer of the first mixture to tack off for about 30 minutes after being applied.

3. A method according to claim 1 wherein the step of allowing the layer of the second mixture to tack off further comprises allowing the layer of the second mixture to tack off for at least about 1 hour after being applied.

4. A method according to claim 1 further comprising forming the facility tool having a tool surface comprising a tooling putty finished to within tolerances of a mold line prior to applying the layer of the first mixture.

5. A method according to claim 1 further comprising:

applying a release coating to said tool surface of said facility tool to facilitate separation of the cure tool from said facility tool; and allowing said release coating to flash off for a predetermined period of time after being applied and prior to applying the layer of the first mixture.

6. A method according to claim 1 further comprising:

applying a rigidizing structure to said layer of the second mixture to substantially fix said layer of the first mixture and said layer of the second mixture in the form of said tool surface, said layer of the first mixture, said layer of the second mixture, and said rigidizing structure forming the cure tool; and post-curing the cure tool to raise the glass transition temperature thereof.

* * * * *